United States Patent
Chen (10) Patent No.: US 9,723,348 B2
(45) Date of Patent: Aug. 1, 2017

(54) ITERATIVE CLOUD BROADCASTING RENDERING METHOD

(75) Inventor: Yaw-Chung Chen, Hsinchu (TW)

(73) Assignee: Jenn-Chorng Liou, Hsinchu (TW)

( * ) Notice: Subject to any disclaimer, the term of this patent is extended or adjusted under 35 U.S.C. 154(b) by 410 days.

(21) Appl. No.: 13/525,803

(22) Filed: Jun. 18, 2012

(65) Prior Publication Data

US 2012/0331168 A1    Dec. 27, 2012

Related U.S. Application Data (60) Provisional application No. 61/499,760, filed on Jun. 22, 2011.

(51) Int. Cl.

| | |
|---|---|
| *G06F 15/16* | (2006.01) |
| *G06F 15/173* | (2006.01) |
| *H04N 21/2743* | (2011.01) |
| *H04L 29/08* | (2006.01) |
| *H04N 21/439* | (2011.01) |
| *H04N 21/854* | (2011.01) |
| *H04H 60/04* | (2008.01) |
| *H04N 21/235* | (2011.01) |
| *H04N 21/81* | (2011.01) |
| *H04N 21/8355* | (2011.01) |

(52) U.S. Cl.
CPC ..... *H04N 21/2743* (2013.01); *H04L 67/1097* (2013.01); *H04N 21/439* (2013.01); *H04N 21/854* (2013.01); *H04H 60/04* (2013.01); *H04N 21/2353* (2013.01); *H04N 21/8133* (2013.01); *H04N 21/8355* (2013.01)

(58) Field of Classification Search
CPC ......... G06F 17/30749; G06F 17/3074; G06F 17/30772; H04H 60/73; H04H 20/82; H04H 60/06
USPC ....... 709/203, 224, 256, 217, 219; 788/3.06, 788/414.3, 3.04
See application file for complete search history.

(56) References Cited

U.S. PATENT DOCUMENTS

| | | | |
|---|---|---|---|
| 7,349,663 B1 * | 3/2008 | Joseph ................ | H04H 20/82 455/3.02 |
| 7,650,361 B1 | 1/2010 | Wong et al. | |
| 7,711,838 B1 | 5/2010 | Boulter et al. | |
| 2002/0152278 A1 * | 10/2002 | Pontenzone ......... | H04H 20/42 709/217 |
| 2006/0268667 A1 * | 11/2006 | Jellison et al. ........... | 369/30.08 |
| 2008/0021577 A1 * | 1/2008 | Ijichi et al. ................. | 700/94 |

(Continued)

*Primary Examiner* — Melvin H Pollack
(74) *Attorney, Agent, or Firm* — WPAT, PC (57) ABSTRACT

The present disclose relates to a computing cloud serving as a collaboration platform where internet connected electronic devices such as smart phones and tablets can log in to author, to review, to edit, to download and to play back digital content. By using different applications, the user may optionally play the role of an author, a reviewer or a consumer to digital content. User-authored digital content as well as recorded music are all stored in the cloud. Professional editing is possible by making overlay audio tracks and sound effect changes available on the client device and earmarking the timing relations among media clips in each media clip's associated metadata. An edited professional playlist is reusable by replacing some sound tracks in iterative host vs client actions. Personalized media insert is integrated into the normal streaming media as part of the inter-user media services or subscription services.

18 Claims, 8 Drawing Sheets

(56) References Cited

U.S. PATENT DOCUMENTS

| | | | |
|---|---|---|---|
| 2009/0063511 A1* | 3/2009 | Myers | G06F 17/3089 |
| 2009/0106429 A1 | 4/2009 | Siegal et al. | |
| 2010/0185673 A1* | 7/2010 | Toebes | G06F 21/10 |
| | | | 707/780 |
| 2010/0255772 A1* | 10/2010 | Hellman | G11B 27/034 |
| | | | 455/3.06 |
| 2011/0231426 A1* | 9/2011 | Fejta | G11B 27/038 |
| | | | 707/769 |

* cited by examiner

ITERATIVE CLOUD BROADCASTING RENDERING METHOD

TECHNICAL FIELD

The present invention relates to an iterative cloud broadcasting rendering method, more particularly, to author, review, play back content on a cloud computing platform and to provide playback of personalized streaming content from a computing cloud to electronic devices, such as smart phones or tablets.

TECHNICAL BACKGROUND

Audio or video broadcasting via internet is very common nowadays. Conventional radio or TV broadcasters may elect to simulcast from internet to increase audience. Internet-only broadcasters may also create source content from their studios and broadcast on the internet. Many applications executable on PC or handset are written to access these radio or TV programs. Source radio or TV programs may also be recorded and become accessible at later times after the sources are being played on air. These are so called on-demand or time-shift playback services. In the music and movie industries, it is common to make recorded art pieces available so that they can be accessed from the internet, usually for a fee. The streaming ends after a downloading transaction.

Some streaming content services can be tailored to an individual or a small community's needs. For example, U.S. Pat. No. 7,650,361 to Wong, et al. describes a pointer-based video broadcasting system where a user can selectively add or delete items on the playlist. As another example, U.S. Pat. No. 7,711,838 to Boulter, et al. describes a system in which each individual user's preferred and distasted songs are analyzed so that individualized playlists can be created and be streamed to addressed user devices on the internet. In prior arts related to personalized broadcasting while the creativity of each individual musician is maintained, the creativity made possible by a DJ or the compatriot audience are not usually included. A DJ usually can contribute in grouping and sequencing song titles to match certain occasional needs for the public. Anyone in the audience might also have his or her non-professional creativity that may equally touch others' heart. It is therefore desirable to have a playback or broadcasting system that is strongly influenced by a hosting DJ but being able to address each individual audience's slightly different needs. Audience-created talk or art pieces are also desirable to be among the playlists to be shared by others.

Recently cloud computing is revolutionizing the way digital content is being consumed. Cloud computing generally has the benefits of increased reliability, reduced cost, being flexible to expand and being accessible from anywhere. Cloud is being used not only to store music content but also to offer different kinds of streaming services. As typical examples of cloud-based content services, there are content sharing services such as the YouTube for video sharing. There is also a service provided by Mspot Inc. where a user may synchronize all digital content among his or her own devices so that music can be played on the go. Apple Inc. created the iCloud service that stores personally-owned content and streams to personal devices automatically. Cloud computing is also gradually being accepted as a platform to author. Digital content can be created, edited, saved in the cloud using software offered in the cloud. Furthermore, content can be shared and reviewed as part of the collaborated effort among users.

It is desirable that a cloud platform is created so that content creation, editing, storing, sharing and automatic streaming are all made available. The client users of the cloud may equally access the platform with different kinds of devices. By using different applications, the user may play the role of an author, a reviewer or a consumer to digital content. Specifically as part of the evolution to the broadcasting technology, it is desirable that a DJ's creation, a listener or viewer's contribution, as well as recorded music are all made available from the cloud. It is further desirable that without the need of specific editing tools in conventional studios, creations are recorded with a running application on a client device and a DJ can arrange a professional playlist and make overlay audio tracks and sound effect changes with the assistance from the cloud. It is desirable that a listener or viewer can selectively choose what he or she would like to consume with the flexibilities provided by a cloud platform.

Accordingly, what is desired are methods to fully utilize the capability of a cloud platform so that digital content creation, editing, storing, sharing and automatic streaming are possible. Additionally, what is desired are methods to record, submit, insert and select digital content in real time so that the cloud becomes an collaborated broadcasting rendering platform addressing each individual audience's needs.

TECHNICAL SUMMARY

The present invention provides a method for a computing cloud to act as a collaboration platform for media creators and consumers. A client device connecting to the computing cloud can be a media consumer in playing back playlists contributed by others, a creator in authoring pieces of talk clips or music recording, or a broadcasting producer who turns pieces of selected media clips into a playlist. In order for this collaboration platform to work there is a computing cloud which takes the role as the rendering host which keeps the pre-broadcast playlist (PBP) (or host playlist), at least one client device which either plays back the pieces of media content in reference to the PBP or authors media clips or playlists, and the internet which acts as the common carrier for the interactions between the computing cloud and the plurality of client devices. The computing cloud keeps a large reservoir of digital content which DJ and some among the audience may selectively pick and insert into the playlists they edit. Each piece of digital content is accompanied by a set of metadata carrying attributes related to its origin, genre, in what effect it may be played, the time synchronization relations against other neighboring digital content pieces and information related to the authorization to play.

In the first embodiment, upon receiving a login request from a client device intending to be in a media consumer role the rendering host streams a PBP with the associated sets of metadata to the client device as the first iteration action. The client device may prioritize among those media clips in the PBP, or omit according to its internet bandwidth and connection quality, its music preference and account authorizations. The rendering host receives the user feedback and then streams those media clips accordingly as the second iteration action. The client device plays those media clips after receiving and may replay if the metadata indicates that it is authorized to.

In the second embodiment, the client may request to be a temporary authoring party (to be called a 'casual author' later) after logging in as a media consumer. The rendering host receives a piece of talk or art creation from the client, optionally mixes it with an existing piece of digital content as the background to the client contribution, creates a single title playlist and a set of metadata associated with the combined piece of media clip and broadcasts to the selected audience as an inserting playlist to the normal playlists they receive.

In the third embodiment, the client user in a media consumer role may optionally transfer the right to replay to others, assuming being authorized by the metadata of a media clip. Upon receiving a 'transfer' request, the rendering host can inform the recipient with a single title playlist with associated metadata. The recipient may receive the gift via a set of username and password to log in to the rendering host, or via a prompt if his or her client device is already online The receiving party can elect to download the piece of digital content and play immediately or at a later time. Other public linking means such as an html file can be used as the carrier to the gift and it can be sent via an e-mail service or other messaging services. This way the gift can not only be playable with an application in the client device but also possibly using a browser or a player commonly available. By using certain elements in the metadata the donator may also define the time to replay so that donator and recipient(s) may replay synchronously.

In the fourth embodiment, a pending PBP is allowed to only go through the superintendant in the first iteration. Upon hearing or seeing content that are not matching the guideline of the channel, the superintendant presses a button of the superintending application of his or her client device. By controlling the superintending element embedded in the metadata the superintendant can nullify this piece and this piece of digital content will be skipped in the playlist for the general public, when the rendering host carries out the broadcasting in further iterations with other consumer client devices.

In the fifth embodiment, on request pre-recorded clips such as pre-recorded music works and "bed sounds" (applaud, relaxing background music, tense drumbeat, etc.) can be downloaded to a special 'Producer Console' application. The Producer application is designed to be able to arrange the selected pre-recorded music works and overlay bed sounds to be played in sequence or being overlapped, much like a multi-track recording console. As a producer the DJ can hear the pre-recorded music works and overlay bed sounds with his or her headset on-the-fly while a talking session is in progress. A microphone in the client device is being used to record the talking session. All pre-recorded music works, bed sounds selected and the talking session recorded are accompanied by their metadata. Some elements in metadata (called the "editing attributes" in this work) are designed to carry playing sequence, time to play, sound effect changes and synchronization information among media clips. Upon receiving the playlist indicating the selection of pre-recorded music works and overlay bed sounds, plus the recording of DJ's talk or performance and the editing attributes, the rendering host essentially keeps a copy of the DJ's multi-track production work that can be re-constructed and re-edited. In case DJ had elected to include bed sounds as the background to the voicetrack, the rendering host can also mix those multiple track media clips according to the original timeline and create a simplified media clip. High quality bed sounds are used by the rendering host to carry out the action to mix, or for the consumers to download and play back, although the DJ may use low quality ones in the producer console application.

Finally the rendering host may provide either the DJ's original production session or the simplified production where multiple tracks are mixed to other client devices for further editing or simply playing back.

In short, the invention provides an iterative playback and editing mechanism. Based on this design the rendering host keeps the original pieces of digital content and the original editing attributes. This way, client devices can download the playlist in the rendering host for further editing, or to selectively play back. The client device can further act as the author to participate in the broadcasting, or a donator to transfer the playback allowance to others to replay. A superintendant mode is also made available as one of special applications.

All in all, the present invention provides a method for carrying out iterative media broadcasting rendering from the cloud, the method comprising: connecting a client device to a computing cloud wherein a rendering host keeps one or more pre-broadcast playlists (PBP); choosing a role for the client device among being a consumer or a superintendant to the PBP, or a producer to another PBP, wherein each media clip in the PBP has its corresponding metadata which optionally includes an editing attribute in a format known to the rendering host and the client device; and both the rendering host and the client device being able to reconstruct an original client device's production work according to the editing attribute in the PBP.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
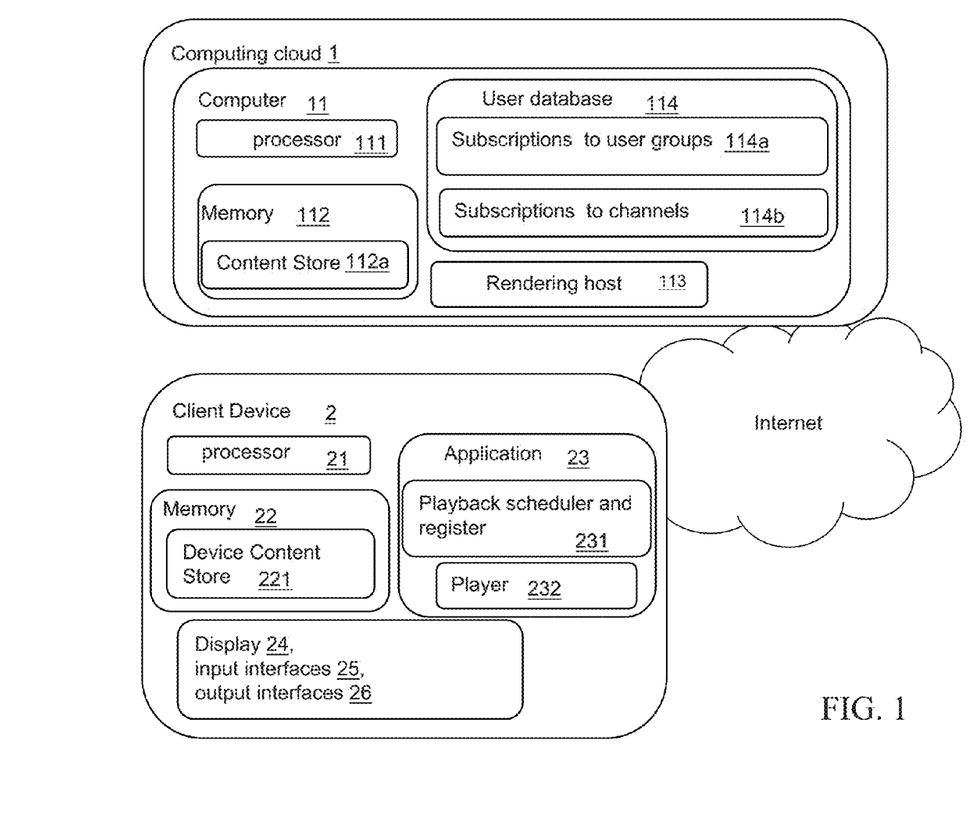
FIG. 1 is a block diagram of a system that may incorporate embodiments of the present invention.

FIG. 1 is a block diagram of a system that may incorporate embodiments of the present invention. The system consists of a computing cloud 1 and a client device 2 connecting to the computing cloud 1 via internet. The computing cloud 1 keeps one or more PBPs and a plurality of digital content including those digital content included by the PBP. The client device 2 either plays back the pieces of media content in reference to PBP or authors other pieces of media content or edits another playlists. The internet acts as the common carrier for the interactions between the computing cloud 1 and the plurality of client devices 2.

The computing cloud 1 has one or more computers 11 having one or more processors 111, one or more memory 112 which also include content stores 112*a*, one or more rendering hosts 113 for managing PBPs comprising enlisted pieces of digital content and streaming the BPBs and pieces of digital content to client devices. The computing cloud furthermore keeps a user database 114. According to each client device user's subscriptions to user groups and channels the user database 114 further includes subscriptions to user groups 114*a* and subscriptions to channels 114*b*. The computing cloud 1 keeps a large reservoir of digital content which DJ and some among the audience may selectively pick and insert into the playlist it edits. Each piece of digital content is accompanied by a set of metadata carrying attributes related to its origin, genre, in what effect it may be played, the time synchronization relations against other neighboring digital content pieces and information related to the authorization to play. A rendering host 113 may be subdivided into broadcasting channels. Each channel may be referred to as a 'rendering channel' or 'broadcasting channel.' Further details for the rendering host 113, the user database 114 and the content store 112*a* will be given later with the aid of FIG. 3.

The client device 2 comprises a processor 21; a memory 22 coupled to the processor 21; a device content store 221 stored in the memory, that stores one or more pieces of digital content; a display 24 that optionally displays the local playlist and some element of the basic attributes 31; input interfaces 25, such as a microphone, keypads or a touch screen and output interfaces 26, such as a speaker, an ear set, a headset or a buzzer; an application 23 stored in the memory 22 and executed by the processor 21, comprising an upload agent (not shown in FIG. 1), sending the client identity to the rendering host 113 to request for a role; a playback scheduler and register 231 managing the playlists and recording playback behavior, and a player 232 playing the pieces of digital content in the local playlist finalized by the playback scheduler and register.

In this work 'media clip' is used interchangeably with 'media,' 'media piece,' 'media file,' 'clip,' 'content' or 'digital content.' Both voicetrack and soundtrack are also used to refer to media clips but a voicetrack refers specifically to a DJ's recording session for its talk or studio performance while a soundtrack is used as a generalized term to refer to any recording. A piece of media clip may include audio, video or podcast contents. Typical examples of media clips are the recording of a person's talk, pre-recorded audio or video digital content for a music performance, etc.

Figure 2:
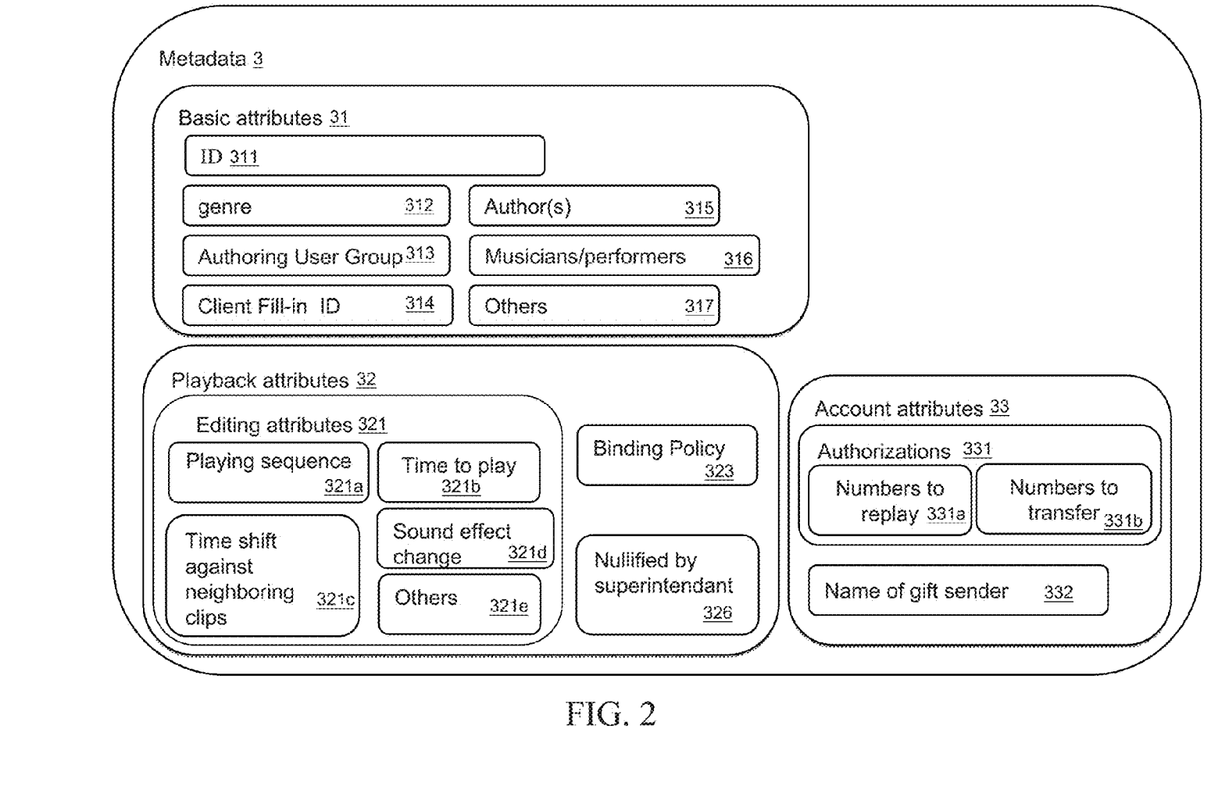
FIG. 2 shows possible elements in the metadata in one embodiment according to the present invention.

FIG. 2 shows possible elements in the metadata in embodiments according to the present invention. Metadata 3 is the auxiliary data to the digital content, identifying its format and origin. In general there are 3 categories of information:

A) Basic Attributes 31. These include song title, author 315, authoring user group 313, band, musicians or performers 316, date of recording or performance, copyright, etc. It may further include a filename or ID 311, sub-ID as the indices to the storage's database and format information such as bit-rate and encoding types. It could also include genre 312, lyrics, location, etc. and all other elements related to the originality of the piece of digital content (others 317). The basic attribute 31 can further identify whether a media clip can be replaced by the client device's own recording work. This could be useful if a consumer likes to create its personal 'station jingle' or when a group of chain stores make use of a common playlist from a rendering host. Each store can replace designated media clips with its own 'store jingle' and create a localized image. This will be indicated by a 'client fill-in ID 314.'

B) Playback Attributes 32. The playback attributes 32 include when and how the piece of digital content is being decided by the DJ to play. The most critical set of elements is the editing attributes 321 which further include playing sequence 321*a*, time to play 321*b*, time shift against neighboring clips 321*c*, sound effect change 321*d* and others 321*e*. These elements are in a format known to the rendering host and the client device, making both of them being able to reconstruct an original client device's production work. The playback attribute 32 further includes playback policy (binding policy 323). For example, the DJ creating the playlist or the rendering host 113 could determine that certain medium clips have higher priorities than others so that in case the internet connection is poor, the ones with higher priorities shall be streamed sooner or be played by the consumer end device earlier than others. A 'Nullified by superintendant 326' element helps a superintendant to indicate a nullification action after reviewing the playlist on a superintendant client console.

C) Account Attributes 33. These include account-specific authorizations 331 and personalized information. The DJ or the rendering host 113 may determine that certain pieces among the music or talk clips it played can be repeated as replay (numbers to replay 331*a*). The account attribute can further define whether the replay is transferable (numbers to transfer 331*b*). A recipient of a gift song also gets to know who the gift sender is as the sender's name can be embedded in the metadata (name of gift sender 332).

Any existing pre-recorded music or other recording media can be enlisted to be included in the computing cloud and be stored in its content store 112*a*. Filling in elements of the basic attribute 31 of metadata 3 is one of the necessary steps. Elements in the playback and account attributes may be blank to start with. They may only be filled-in after editing and authorization actions step in. In this work in order to manage casual authors' contributions, user groups are used to categorize authored media clips. User groups are also used for client devices to indicate their areas of interest. A digital content consumer can be a subscriber not only to certain channels which are being regularly broadcasted (as a 'channel subscriber') but also to certain user groups which only occasionally push their media clips (as a 'user group subscriber'). A channel subscriber can simply be one of the general audiences who happens to tune in to this channel. Exemplary details will be given later.

Figure 3:
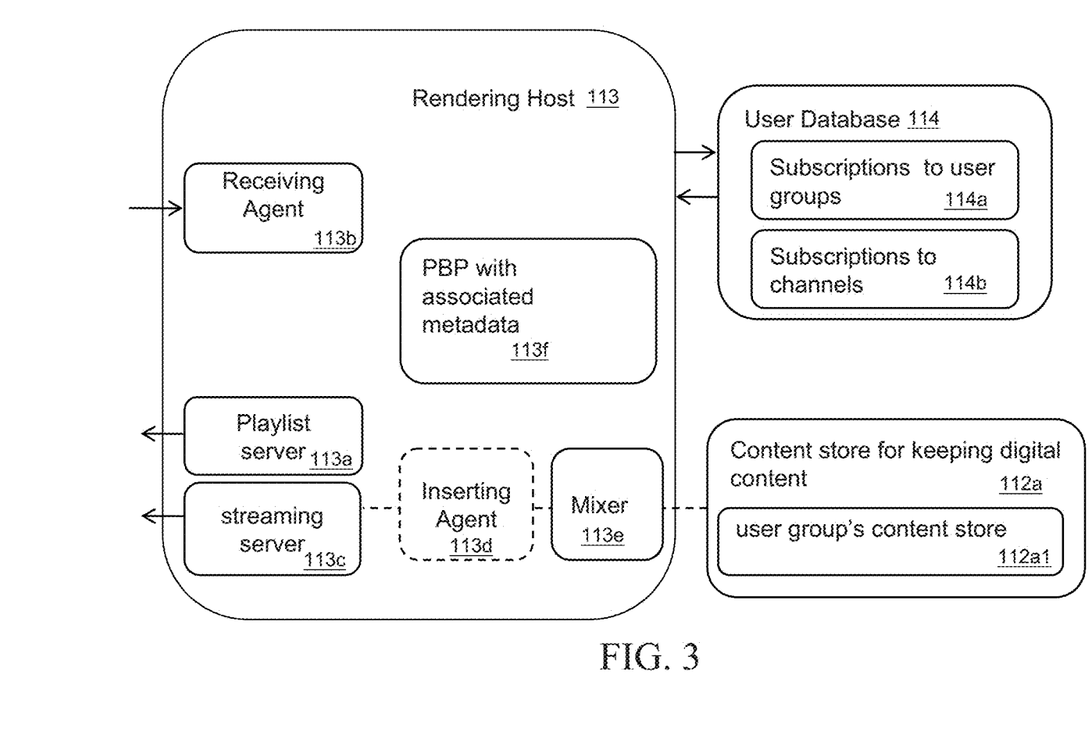
FIG. 3 shows the constituting elements of the rendering host in various embodiments according to the present invention.

FIG. 3 shows the constituting elements of the rendering host in FIG. 1. The rendering host 113 comprises a playlist server 113*a* for sending the PBP and its associated metadata 113*f* to client devices 2 which may adjust for a partial list (called a 'derivative playlist') among the PBP to download; a receiving agent 113*b*, receiving from a client device account identity, the derivative playlist if the client is in its consumer role and the producer playlist if the client is in its producer roles, the request to transfer certain pieces of digital media to others, authored media clips and playback scores; a streaming server 113*c*, sending pieces of digital content to the requesting clients including those in the derivative or pre-broadcast playlist; an inserting agent 113*d*, processing requests of media transfer and user group media dissemination and sending the gift certificates or inserting clips to their recipients, and a mixer 113*e*, mixing multiple pieces of digital content into one and creating its associated metadata. A rendering host works closely with other elements of the computing cloud, e.g., the user database 114 and the content store 112*a*. For example, the streaming server 113*c* identifies which media clip is to be delivered and will fetch a copy of the media clip from the content store. Furthermore, a special area in the content store 112*a* is allocated for storage of media clip submissions from casual authors (user group's content store 112*a*1). The inserting agent 113*d* may get to learn that a new piece of media clip in a user group has just become available. It will then check against the subscriptions to user groups 114*a* in the user database 114. A channel subscriber as is listed in the subscriptions to channels 114*b* gets to receive the pushed media clip he or she desires as a user group subscriber, as the inserting agent assists in fetching the copy of the user group media clip and streaming to his or her client device. In FIG. 3 the inserting agent 113*d* is drawn in dotted line. This is because that its function is cross-rendering host. The user of rendering channel #1 may be sending a gift to a subscriber to rendering channel #2. The inserting agent shall also exchange subscriber or online listener information with user groups so that inserting prompts reach the targeted user group subscribers timely and correctly.

Figure 4:
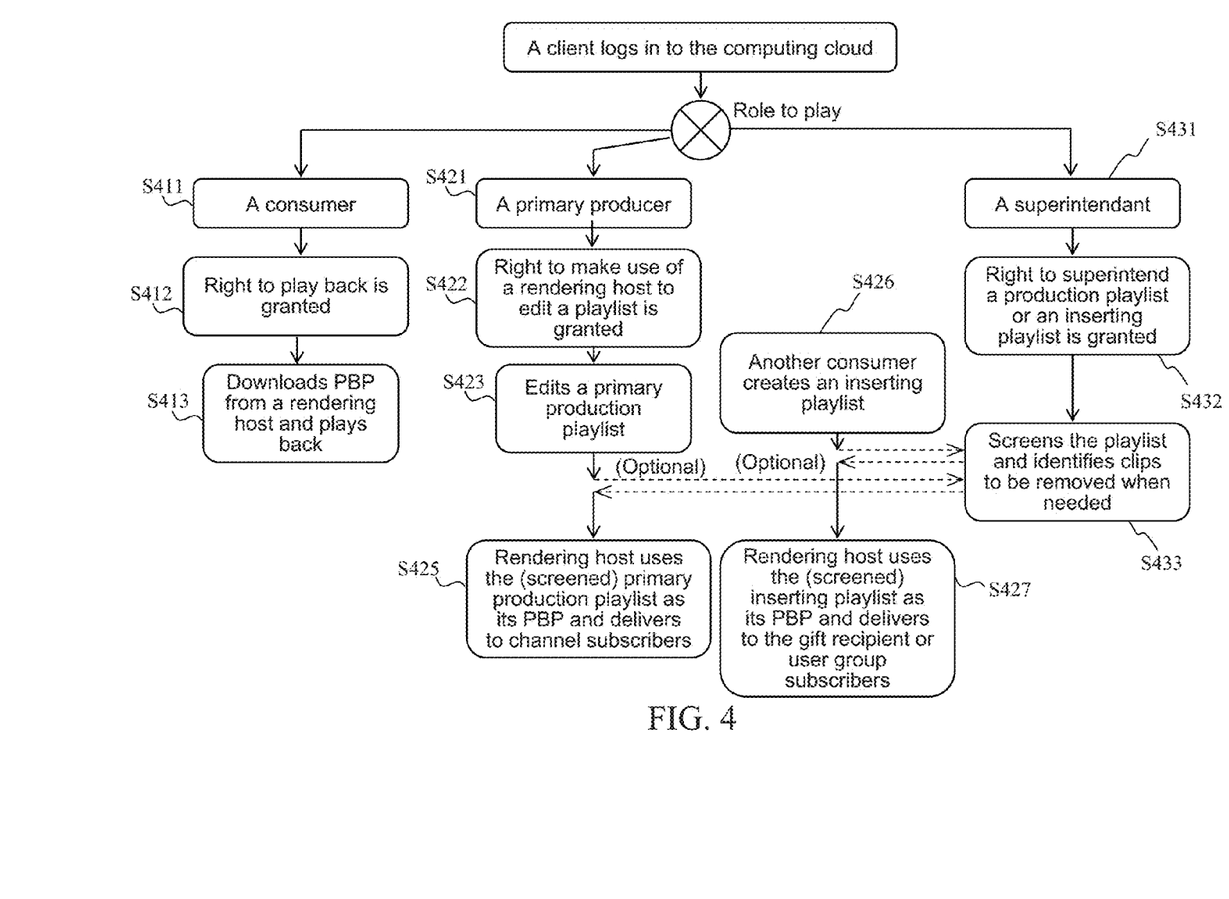
FIG. 4 is the top-level flowchart of a method for authoring and playing back digital content.

FIG. 4 is a top-level flowchart of the method for authoring and playing back digital content according to embodiments of this invention. With reference to FIGS. 1 and 4, the computing cloud acts as a platform where media creators and consumers collaborate. In general all client devices 2 are remotely located from the computing cloud 1. The method includes connecting a client device to a computing cloud wherein a rendering host keeps one or more pre-broadcast playlists (PBP); choosing a role for the client device among being a consumer or a superintendant to the PBP, or a producer to another PBP, wherein each media clip in the PBP has its corresponding metadata which optionally includes an editing attribute in a format known to the rendering host and the client device; and both the rendering host and the client device being able to reconstruct an original client device's production work according to the editing attribute in the PBP. In addition, another client device can download and reconfigure the PBP, or add, delete or replace one media clip in the PBP. As stated, once a client device 2 logs in as a media consumer in step S411, it is enabled in step S412 and it downloads PBP from the rendering host and plays back in step S413. Likewise a client device 2 can log in as a producer in step S421. An original producer to a playlist is called a primary producer, as will be explained later. It is enabled in step S422 to make use of a rendering host to edit a playlist. It then carries out primary production (step S423), creates a primary production playlist and provides the primary production playlist to the rendering host to be used as the PBP the rendering host keeps and delivers to other client devices (step S425). Another consumer in the system may play the dual role to author a piece of talk clip or music recording, or transfer the right to replay downloaded music to others. In this case the consumer creates an inserting playlist in step S426 and asks the rendering host to use the inserting playlist as its PBP and deliver to the gift recipient or user group subscribers in step S427. Furthermore, the client device may log in as a superintendant (step S431) and is granted the right to screen a production playlist or an inserting playlist in step S432. It screens the playlist and identifies clips to be removed if necessary in step S433 and sends the modified production playlist or inserting playlist back to the rendering host, to be used as the PBP for general distribution to subscribers. The large reservoir of digital content which the computing cloud keeps not only includes commercial recorded music but also contributions by the users of client devices. Based on this concept several client device use cases (or the 'roles' of the client device) are available:

i) Playback only. The client device acts as a pure digital content consumer (step S411). It plays back the PBP on the rendering host 113 created by others. That is, the client device downloads one or more PBPs from the rendering host while being in the consumer role. The PBP may be reconfigured according to the user's preference and the policy defined in the metadata by the client application 23, to become a client (or local) derivative playlist, as will be explained later. Furthermore, if the metadata indicates that its corresponding media clip is transferrable, the digital content consumer can inform the rendering host who it intends to transfer the playback allowance to. This will also be explained later.

ii) Casual author. The user of the client mainly plays back the playlist on the rendering host created by others but may contribute occasionally by recording a talk clip or uploading its own piece of media work (in step S426). A typical example is a listener who occasionally report traffic conditions while on the road. The client device can also act as the recording device, as will be explained later. As yet another example a piano player in a music user group may upload his or her recording of work although most of the time he or she may only listen to other's work as was put into a playlist by a host of the user group.

iii) Producer. In this case the user of the client device most likely is a DJ hosting a broadcasting channel (in step S421). The producer can take advantage of the large reservoir of recorded music already in the computing cloud to pick and sequence music to his or her personal preference. The client device, with a proper 'console' application installed, can act as the professional playlist organizer and the recorder to the DJ's talks. The organized playlist as well as the recordings of DJ's voicetracks are streamed back to the rendering host, to be made available to the public. A professional broadcasting is therefore made available within this system. No radio frequency needs to be assigned.

iv) Superintendant. In an autonomous collaboration environment occasionally asking a superintendant as the manager to the content (steps S431 and S432) may be needed to maintain a smooth flow of contributed works. In a close-loop rendering broadcasting a supervising host may also be needed so that media clips included in the playlist follow the guidelines of the channel. In this case the initial 'raw' version of the playlist is only allowed to be accessible by the designated host, or the so-called 'superintendant'. By executing an application in the client device the superintendant can download the playlist to be supervised and the associated metadata and media clips. The superintendant has the authority to nullify certain media clips by pressing a button in the application. The application will then modify the 'Nullified by superintendant 326' element of the metadata associated with the nullified piece of digital content (step S433). The modified playlist with its associated metadata is uploaded to the rendering host. The rendering host will then skip the nullified pieces and broadcast the rest to the public or to the subscribers of the channel or user group. In this case the PBP used in step S425 or S427 will be a screened one. In brief, the steps of superintending a PBP of the superintendent further comprise: downloading the PBP provided by the primary producer and its corresponding metadata and media clips; re-constructing the PBP and playing back media clips included; while listening optionally pressing a button to identify media clips that it desires to remove; uploading the PBP with the removed media clips identified in their associated metadata; and allowing the rendering host to remove the media clips from the PBP as instructed and broadcast the modified PBP to other client devices.

v) Diversified production hosts. This is a special case of the producer case.

There are two roles: the primary (production) host and the secondary (production) host. The primary host (or primary DJ) produces the original playlist for a broadcasting session. As will be explained later in detail, after the primary producer's submission the rendering host essentially keeps a copy of the primary DJ's multi-track production work that can be re-constructed and re-edited. The recording of the talks of the primary DJ therefore remains un-mixed with its neighboring media clips. The secondary DJ just needs to record its talk pieces in similar lengths as the primary DJ did, create its metadata and submit the swapped production. The secondary host does not create its own playlist. It only replaces the primary DJ's talk clips with its own. The rest of the steps afterward remain the same as the primary host's. This arrangement is useful in localization of a famous broadcasting program, especially when audience prefers a different language from the primary production. More details for secondary production will be offered later.

The method and system therefore constitutes a collaboration platform to create and to use contributions by others, much like the sharing concept in the so-called Web 2.0. A client device logging on to the computing cloud may take any of the roles among playing back (as a media consumer), authoring (as a casual author, producer, primary or secondary producer) or screening (as a superintendant).

Figure 5:
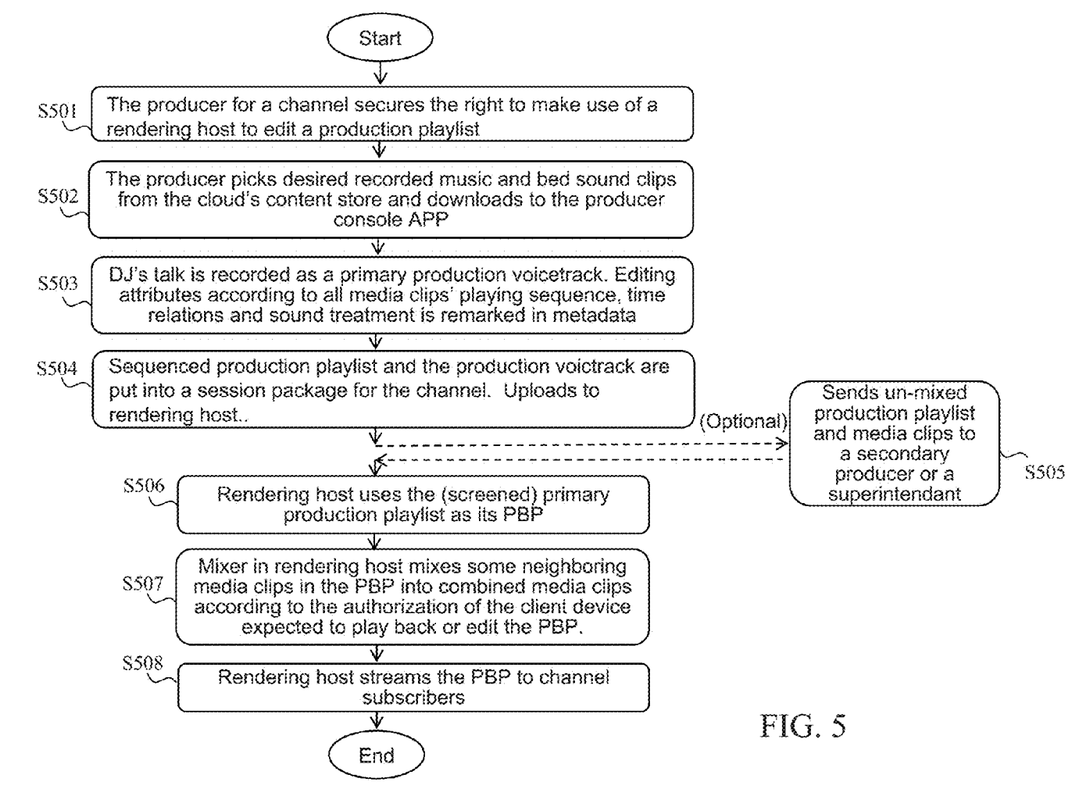
FIG. 5 is a flowchart of a method for a remote primary producer to edit a primary production playlist.

FIG. 5 is a flowchart of a method for a remote primary producer to edit a primary production playlist. In one embodiment based on the present art a comprehensive mechanism has been designed to assist a client DJ away from the cloud rendering host to create professional-look media clips and playlists. The steps for primary production includes: downloading desired pre-recorded clips from the rendering host to the client device; recording a piece of primary production voicetrack and creating its associated metadata; for the pre-recorded clips and the primary production voicetrack in consideration setting sequence to play, optionally identifying dependency and partial use and carrying out sound effect changes; in metadata corresponding to the pre-recorded clips and the primary production voicetrack in consideration indicating the editing attribute according to their time relations and sound effect changes; and uploading the primary production playlist, the metadata corresponding to the primary production playlist and the primary production voicetrack to the rendering host. In step S501, right for a channel producer to make use of a rendering host to edit a production playlist is first granted. In step S502 pre-recorded music and bed sound clips (applaud, relaxing background music, tense drumbeat, etc.) are downloaded to the producer console application executable in a client device. The producer console application is designed to be able to arrange the selected pre-recorded music works and overlay bed sounds to be played in sequence or overlapped, much like a multi-track recording console. In step S503 the DJ hears its media arrangement with his or her headset on-the-fly while a talking session is in progress. A microphone in the client device is being used to record the talking session. All pre-recorded music works, bed sound clips selected and the talking session recorded are accompanied by their metadata.

The constituent elements 321*a* through 321*e* of the metadata's editing attributes 321 are in a format known to both the rendering host and the client device, making them instrumental in reconstructing an original client device's production work. Exemplary uses of these time and effect-related editing elements are depicted below. As one of the examples a 'service jingle' may be assigned to be played at 3 pm sharp (time to play 321*b*). For a commercial broadcasting service a promotion may be defined to be played right after a Latino song in the playlist is being played. The editing attributes 321 therefore indicate time or the sequential relation (playing sequence 321*a* and time shift against neighboring clips 321*c*) among pieces of digital content to be played back. The editing attributes 321 could also be effect-related (sound effect change 321*d*). For example, the DJ could decide to fade out 30 second after a piece of digital content started to play. A piece of music or talk clip could be played at an accelerated mode to create a higher voice pitch, or being mixed with another clip to create a combined effect. These are all earmarked in the attribute which is to include the name of the sound effect change, the dependency among a group of medium clips and their time relations. Furthermore, the editing attributes 321 can include other editing attributes such as the length of the media clip and partial use starting and ending time (others 321*e*). In brief, the editing attribute comprises playing sequence, time to play, sound effect changes used and time relations among adjacent pieces of media clips to be played. As a practical example, DJ's talking session (with its starting time being identified as $T_0$,) may start at certain seconds before the preceding pre-recorded music work ends. DJ may also pick a few bed sounds clips as the overlay soundtracks to the talking session. Those overlay soundtracks shall bear synchronization information such as partial use start $S_{n1}$, partial use stop $S_{n2}$ and the time relation of $S_{n1}$ to $T_0$. Additional sound effect changes (reverb, changing pitch or tempo, etc.) can be carried out as well. For example, the drumbeat can be 30% faster than normal to create a tenser drumbeat. The relaxing background music can be faded out starting at certain seconds after being played, etc. All these parameters are collected by the producer application while the DJ maneuvers on the panel (for example in 'volume bar' icons) of the client device 2. The DJ may change the sequence of the pre-recorded music works and bed sound clips being played, change the pitch of certain clips or change the time certain clips start to fade in or out. The DJ may further discard the talking session and record all over. Or the bed sound overlay can be edited to match a talking session already being determined to be satisfactory.

Figure 6:
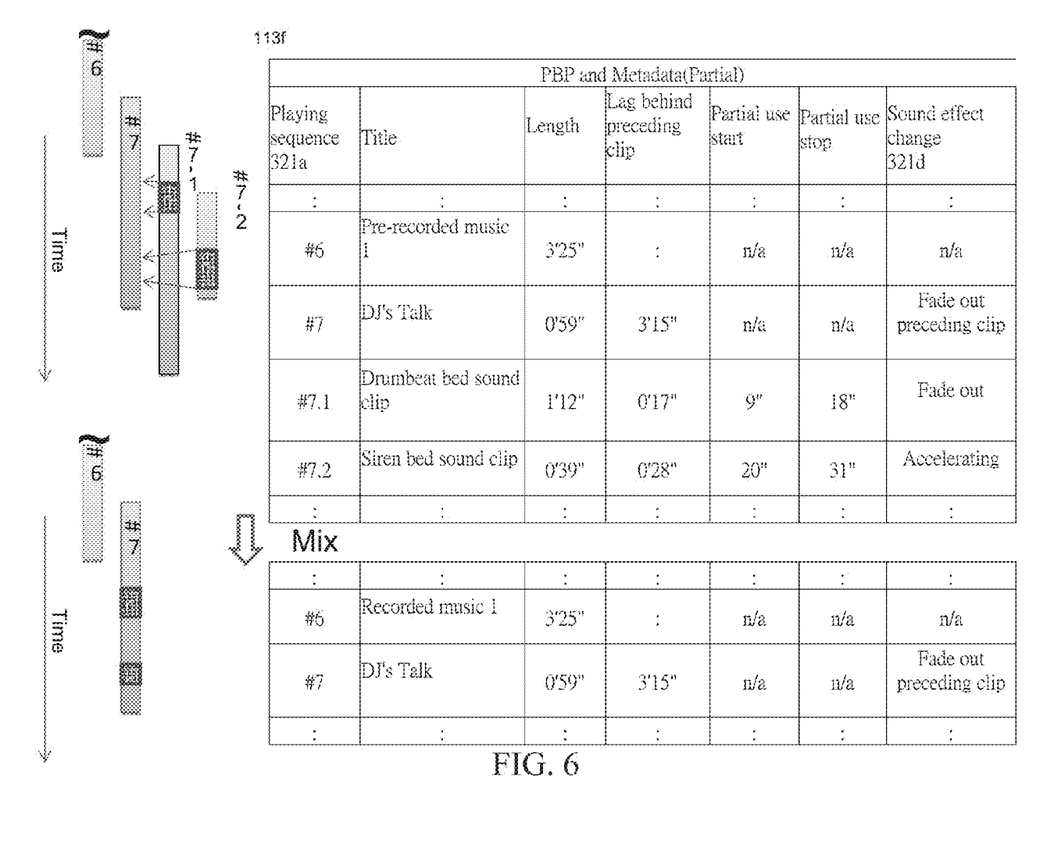
FIG. 6 is a diagram depicting a possible sample of a remote console's original production and possible post-production actions.

FIG. 6 is a diagram depicting a possible sample of a remote console's original production and possible post-production actions. The rendering host retains the original production session as a PBP with its metadata 113*f*. The production session retained can be re-constructed since all media clips in the session remain independent and the editing attributes 321 for all media clips are kept. This is like keeping the original multi-track recording in the studio. The playing sequence 321a not only indicates the order that media clips are to be played but also dictates the dependency of neighboring media clips. For example #7-1 and #7-2 indicates that those 2 media clips are dependant (or subordinate) to media clip #7.

This offline editing ends when the DJ feels that the overall work including the sequence of commercial recorded music, background sound clips plus talking sessions is satisfactory. The action to mix some clips into one can reduce the file size of an edited session. But this is not preferred to be carried out by the client device console. This is for sound fidelity and bandwidth conservation reasons. Multiple pieces of high quality recorded music and bed sounds (e.g. those recorded in 192 Kbps) can be time and bandwidth consuming if a DJ choose to download frequently. It makes more sense that low quality recorded music and bed sounds clips are downloaded or maybe stored in the producer device so that they can be accessed on-demand. Low quality media clips are equally capable for the console application to determine the editing attributes as demanded by the producer. In step S504 while the editing is completed, for example for an one hour program, a sequenced playlist with indications of all participating media clips (recorded music, bed sounds and talks), their metadata, and the producer's recording clips for talks are collected and wrapped into a 'session package'. Media clips for recorded music and bed sounds are not part of the session package because they are already in the rendering host, in their high-quality format. The session package is then uploaded to the rendering host, or optionally be sent to a superintendant or a secondary producer if desired in step S505.

If the process does go to the superintendant, the superintendant makes a remark in the metadata for the media clip to be removed. In case the DJ's voicetrack #7 in FIG. 6 is to be eliminated, the rendering host not only removes clip #7 but also removes its dependant clips #7-1 and #7-2. Similar to the producer case, low fidelity pieces of digital media are to be passed to the superintendant for its review. This saves the bandwidth needed and expedites the looping time. That is, while the client is in the producer or the superintendant role, the media clips are being downloaded optionally in a lower fidelity format than while the media clips are being downloaded by a client device in the consumer role. In step S506 the rendering host takes the (screened) primary production playlist and uses it as its PBP. In step S507 the rendering host may use its mixer 113e to mix some neighboring media clips, e.g. a talking clip with its overlay bed sounds, into combined works according to the synchronization and sound effect change rules indicated in the metadata. This is usually a step proceeding to the broadcasting of a PBP to consumers. As is shown in the lower half of FIG. 6, the mixer in rendering host mixes clip #7 with its dependant clips #7-1 and #7-2 following the metadata's dependency rules. This simplifies the PBP and reduces unnecessary media clip downloading and the bandwidth needed. The action to mix is shown in steps S507. In case the rendering host is to send the PBP to consumers, the mixer shall use the high quality version of the medium clips for voicetracks, bed sounds and recorded music so that the consumers play the production in the highest quality. The rendering host may also choose not to mix all media clips, allowing client devices to carry out more flexible playlist recompilation. That is, the rendering host selectively mixes some neighboring media clips in the PBP into combined media clips according to the authorization of the client device expected to play back or edit the PBP. Lastly the rendering host streams the playlist to subscribers in step S508. This is the remote studio concept introduced in this invention, or the producer use case for the client device.

Here only editing of sound clips is taken as the example although editing video clips can be handled similarly. Also, be noted that although mixing sound clips is referred to most in this work, the action to mix 2 pieces of digital content is not only limited to audio clips. Two pieces of video clips can be mixed in the senses that two visual perceptions are combined, one being faded in while the other being faded out, a caption or cartoon is being overlaid onto a video, etc. A piece of audio work can be mixed to a segment of video clip as one of its sound tracks, as is very commonly seen.

In this art attempts are made to offer broadcasting programs tailored to each consumer's needs. Each individual client device has its independent influence what to be downloaded and played next. That is, even if the channel playlist and the inserting playlist are the same, different consumers may still ask for different derivative playlists due to different preferences and internet bandwidths. The data shall therefore be streamed in the unicast mode. In case personalization is disabled and special IP address assignments are possible, sending data to an arbitrary number of client devices in a multicast mode is possible. In this work the term 'broadcast' is used as a generic term to indicate the media distribution in whatever possible streaming means including multicast, unicast and mixed multicast and unicast. It should not be interpreted as the 'broadcast' as is defined in the multimedia presentation over internet community when a single device is transmitting a message to all other devices in a given IP address range.

Not all channels in the present system broadcast consecutively (e.g. 24 hours a day). In one embodiment, a rendering user group may be formed to allow the access of media clips collected in a single event. A typical example is a concert. Multiple media clips are collected into the concert's user group, representing the on-site recording of the whole event. Ticket holders of the concert may be allowed to get access to this user group collection to listen or view again for what being performed, as a premium service to the concert attendees. Coupons in the form of access codes and passwords maybe issued to ticket holders. The users get access to the content after logging in. The inserting agent 113d in the rendering host takes the request and delivers the media clips requested, just like it handles the action of transferring the authorizations to replay. A coupon holder can optionally transfer the authorization to replay to others, in similar actions and responses depicted before for the transfer of replay authorization to others.

Modern radio or TV broadcasters make use of an auto-scheduler such as a WinMedia® system to produce, mix, create voice tracks, schedule music and manage ad traffics in the studio. A complete session of (e.g. 1-hour) scheduled work is put into a playlist. The playlist dictates when and how the associated multi-track media clips (e.g. DJ's voice, bed sounds, music and ad tracks in their 192 bps mp3 format) are being used to be put on air. The playlist further includes the sound effect changes and time relations among neighboring media clips. In one embodiment, a special client device in a production role can be designed to access the resulting playlist in an auto-scheduler. With properly created metadata, voice tracks, scheduled music and bed sounds in a broadcasting session created by a radio or TV broadcaster in the studio can be submitted and be turned into a broadcasting session in this system. That is, while the client is in the producer role, the uploaded primary production playlist, pieces of media clips and their associated metadata are converted from media content and playlists created by conventional radio or TV broadcasters. The resulting playlist, metadata and media clips are saved in the rendering host, ready to be streamed to its channel subscribers. Conversely, collaborated work in this system, being able to address the general public's interest, can be delivered to an auto-scheduler maintained by a radio or TV broadcaster. The broadcaster acts as a client device in a consumer role. Subject to the playback policy, a derivative playlist is created and proper media clips are downloaded to the broadcaster's studio. The broadcaster may then re-broadcast the resulting media clips in the local playlist on air.

In this invention the idea of diversified production hosts is introduced. A secondary producer can re-use the primary producer's playlist with its talking clips replaced. In this case when a client device logs in to act as a secondary producer it carries out secondary production based on the PBP provided by the primary producer and provides the secondary production playlist to the rendering host to be used as the PBP the rendering host keeps and delivers to other client devices. The method to carry out secondary production comprises: downloading the PBP provided by the primary producer and its corresponding metadata and media clips; re-constructing the primary producer's PBP and playing back media clips included; recording a piece of new production voicetrack corresponding to the primary production voicetrack and creating its associated metadata; replacing the primary production voicetrack and its metadata in the primary PBP with the new production voicetrack and its metadata to become the secondary production playlist; in metadata corresponding to the media clips and the new production voicetrack indicating the editing attribute according to their time relations; and uploading the secondary production playlist, the metadata corresponding to the secondary production playlist and the new production voicetrack to the rendering host. The flowchart of a method for a secondary producer to edit a primary producer's playlist is very similar to the primary producer's flowchart in FIG. 5 and is not drawn separately. The application in the secondary DJ's client device reconstructs the primary production and allows the secondary host to listen through its ear set. This replaces step S502 in FIG. 5. Then the secondary DJ records talk pieces (new production voicetrack) in similar length as the primary DJ did (primary production voicetrack) and creates its metadata. This replaces step S503 in FIG. 5. The sample production work in FIG. 6 can be used as a practical example. Here the secondary producer records its own voicetrack in an effort to replace the primary producer's voicetrack #7 in FIG. 6. Other media clips remain unchanged. The re-packaged playlist, metadata and the secondary DJ's talking clips constitute a secondary production with the reference to the primary playlist. They are collected to become a new session package to be uploaded to the rendering host (step S504) or optionally to be reviewed by a superintendant. Finally the rendering host uses the (screened) secondary production playlist as its PBP.

Similar to the producer use case, in order to save the downloading time and bandwidth it makes more sense that low quality recorded music and bed sound clips are downloaded or maybe stored in the secondary producer devices so that they can be accessed on-demand. Similarly the primary producer's talking clips are optionally turned into a low fidelity format in downloading.

Figure 7:
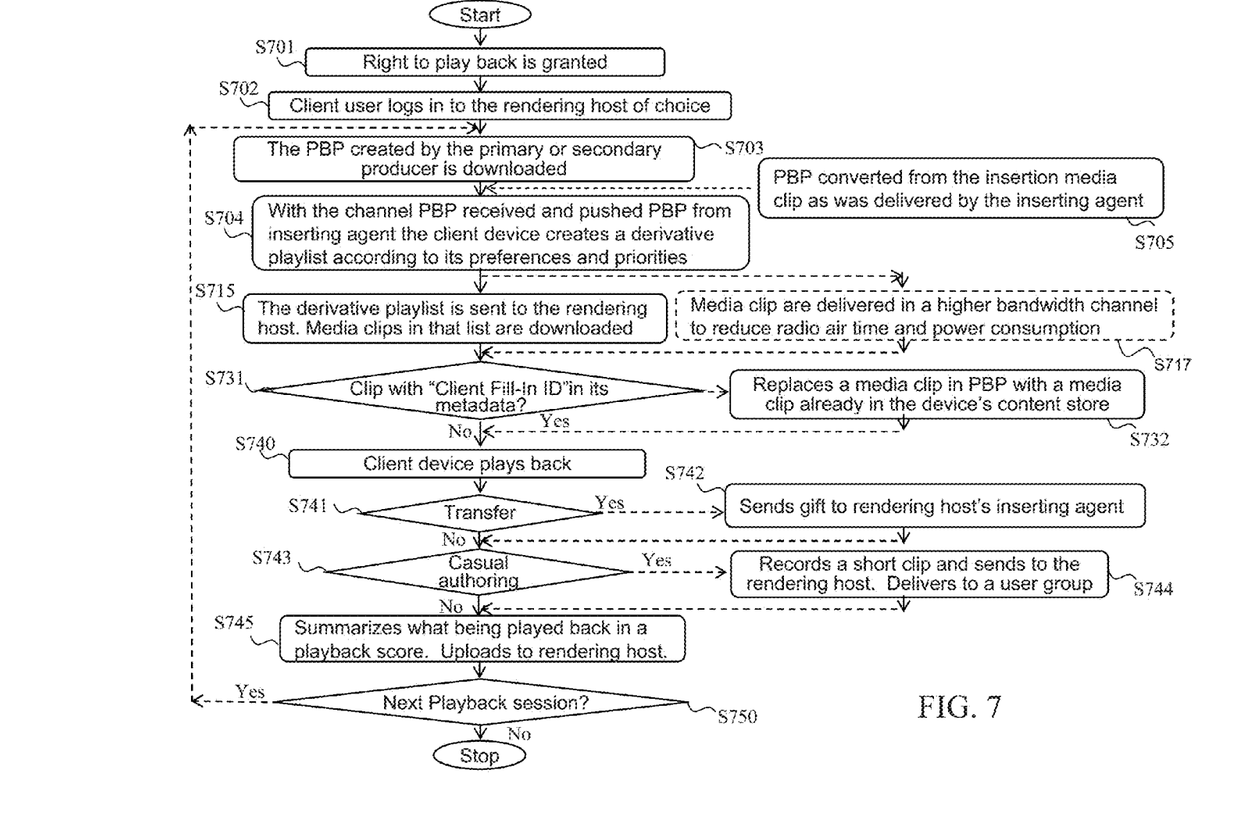
FIG. 7 is a flowchart of a method for a consumer to play back, to transfer and casually author.

FIG. 7 is a flowchart of a method for a digital content consumer to play back, to transfer and casually author. The steps for a digital content consumer in consuming one or more PBP comprise downloading one or more PBPs with their associated metadata; creating a derivative playlist based on host playback policy as stated in the metadata associated with the PBP and the consumer's preferences and priorities; requesting the rendering host to download pieces of media clips as indicated in the derivative playlist; performing playback; and submitting a playback scores to the rendering host. In steps S701 and S702, upon receiving a remote application's logging in information, the rendering host checks for validation of the request by checking against the account information in its user database 114. Once validated, the PBP with associated metadata 113$f$ will be released to the remote client via the playlist server 113$a$ in step S703. In step S704, the playback scheduler and register 231 in the client device may prioritize among those media clips in the playlist, or omit, according to the binding policy 323 of the media clips enlisted in the playlist, its internet bandwidth and connection quality, its music preference and account authorizations, or include occasional media clip inputs from the inserting agent 113$d$ (in step S705). As a result, a PBP is modified and becomes a derivative playlist. In step S715 the rendering host receives the derivative playlist and then streams those media clips accordingly as the second iteration action. In step S740 the client device plays those media clips after receiving and may replay if the metadata indicates that it is authorized to. The final playlist on the client device is therefore a 'reconfigured' version of the original PBP. In order to help monitor the actual playback performed, the playback scheduler and register 231 in the client device may summarize what it plays and send playback scores back to the rendering host, as is indicated in step S745. If all pieces of digital content downloaded have been used up, the consumer may elect to download the next playback session, as is indicated in step S750.

In addition, the consumer may fill in with backup media clips in device content store 221 if the rendering host cannot deliver the media clips listed in the derivative playlist in time, or if the metadata in the derivative playlist indicates the need to fill in. That is, due to the unpredictable nature of downloading data bandwidth, the downloaded media clips may not catch up the assumed playing time as defined by the derivative playlist. In this case the client application 23 may optionally fill in with backup media clips. The actual playback performed constitutes the client's local playlist and the local playlist may not necessarily equal to the derivative playlist.

In yet other embodiments, some media clips in the PBP can be assigned to be replaceable by the client device's own recording work. The replaceable media clip is a slot in the playlist without real media content due to its purpose. A replaceable media clip will be indicated so in its associated metadata by a 'Client Fill-in ID 314.' As long as the client device's policy wishes to and it is also authorized to, the client application will replace the 'empty slot' in the PBP with its own recording. This could be useful if a consumer likes to create its personal 'station jingle' or when a group of chain stores make use of a common playlist from a rendering host. Each store can replace designated media clips with its own 'store jingle' and create a localized image. The client application 23 may summarize the resulting playlist performed by the client device into a playback score and upload it to the rendering host for accounting purposes. Steps S731 and S732 in FIG. 7 depicts how the client device inserts one of its own media clip upon finding an item in the playlist being remarked with 'Client Fill-in ID 314' in its metadata.

In some embodiments number of times to replay and transfer (of copyrighted medium clips) can be defined. Since each user is addressable, the system can be programmed to offer allowances for playback times. This can be useful for paid copyrighted materials. Specifically, in the playlist with the accompanied sets of metadata streamed to each individual client device, the number of times allowed to replay numbers to replay 331*a* is set. The application in the client device can store the piece of medium content with the associated metadata in its memory or storage. While the user decides to replay, the medium clip is being played and the allowance is being deducted. Optionally the remaining count to replay can be part of the playback score being sent to the rendering host for accounting purposes.

Figure 8:
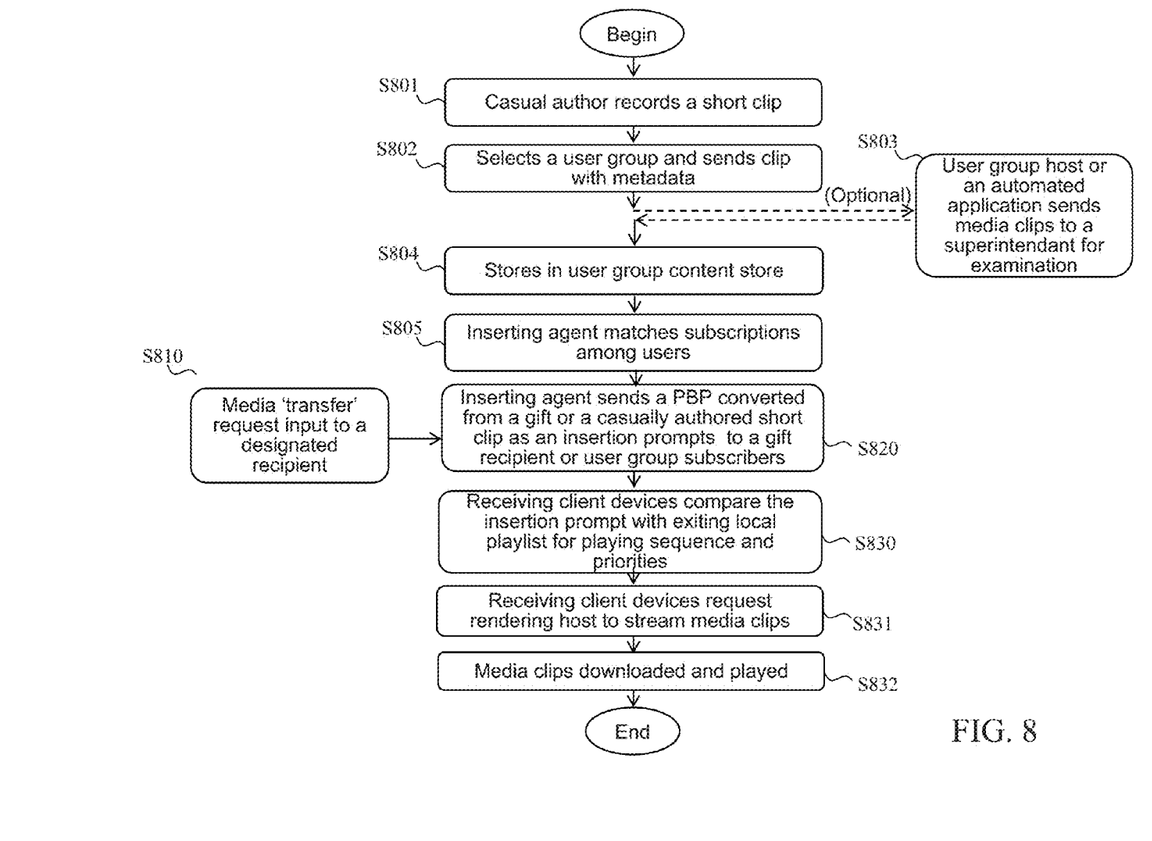
FIG. 8 is a flowchart for an inserting agent to push personalized media clips including a gift and a casually authored media clip

FIG. 8 is a flowchart for an inserting agent to push personalized media clips including a gift and a casually authored media clip. According to one embodiment of the invention the system can further offer a gift service, as a client user may opt to transfer unused allowances to others. While the client is in the consumer role, the steps to send a gift include: creating an inserting playlist based on the authorization of one of the media clips' account attribute as is indicated by numbers to transfer 331*b* in the metadata associated with the PBP; and providing the inserting playlist to the rendering host to be used as the PBP the rendering host keeps and delivers to another client device as a gift. This can be carried out with a transfer message through the data path going back to the rendering host. Upon receiving a 'transfer' request in steps S741 and S742, the rendering host passes the request to inserting agent 113*d* so that it informs the recipient with a single title PBP with associated metadata (steps S810 and S820). The inserting agent 113*d* in the rendering host judges based on the recipient's identity, if it is a member of the rendering system it simply prompts that member (S820). The prompt is a short message in the form of a single title inserting playlist (an 'inserting playlist' pointing to an 'inserting clip') with associated metadata. If it is an e-mail address it sends the gift certificate via an e-mail service; if it is a membership in a social network it uses a communication protocol mutually agreed upon to pass the gift certificate. The gift certificate can be in a form of a set of username and password to log in to the rendering host, or a prompt indicating the inserting media clip's name, gift sender, remaining times to play and downloading site. The receiving party can elect to download the piece of digital content and play immediately or at a later time. Other public linking means such as an html file can be used as the carrier to the gift and it can be sent via an e-mail service or other messaging services. This way the gift can not only be playable with an application in the client device but also possibly using a browser or a player commonly available. The donator may define the time to replay 321*b* in metadata 3 so that donator and recipient(s) may replay synchronously. The recipient client device 2 may optionally upload a thank you note and address it to the gift sender upon receiving a gift inserting playlist wherein the thank you note can be in a form of another inserting playlist with a set of metadata and optionally with a recorded media clip.

In one embodiment of this collaboration system a client user can also participate in content creation. Some user groups allowing members to share his or her experience are formed. A member may use its application to record his or her talk, or a piece of performing work. That is, in the consumer role the client device can casually author a media clip and upload it to the rendering host, with steps comprising: optionally clicking the record button on the application and creating a recording clip; optionally playing back to review the recording clip and creating an inserting playlist with its associated metadata; uploading the recording clip, the inserting playlist and its metadata to the rendering host to be used as the PBP the rendering host keeps; and delivering the PBP, the recording clip and the metadata to a user group the consumer designated or a virtual user group the rendering host sorted from the user database related to one or more client devices. In steps S743 and S744 the application in the client device can forward its recorded work to the rendering host so that it can distribute to a user group. The user presses a record button to start the recording in step S801. The application will allow the user to define the user group this casually recorded media work belongs to (step S802). The rendering host or the user group host can further add overlay bed sounds as the background (with a sound mixer) to improve the playback experience. In step S803 the user group host or an automated application may optionally send media clips to a superintendant for examination. In steps S804 and S805 the authorized clips authored is saved in user group's content store 112*a*1 as the inserting agent 113*d* tries to match interested subscribers out of subscriptions to user groups 114*a*. In step S820 the inserting agent sends a PBP converted from a gift or a casually authored short clip as an inserting prompts to gift recipients or user group subscribers, where gift sending is being triggered by a 'transfer' request made available in step S810. In steps S830 through S832 each receiving client device compares the policy as define by the inserting playlist's metadata with its exiting local playlist for playing sequences/priorities and determines which media clips to be downloaded and in what priorities.

In some user groups multiple client device users may be allowed to create one concatenated work. At least one client device uploads to the rendering host one or more time-related pieces of digital content whose metadata indicate the end-to-end cut-in and cut-out times and their sequence to play. This allows the rendering host to create concatenated playback effect when being played back in sequence by the client devices. As an example a novel or an essay can be read out by different users in a user group, each being assigned a starting and an ending point. The combined work becomes a collaborated reading essay contributed by all those who participated.

The upload agent in the client device may further upload device type in terms of stationary or mobile, and location data. In one embodiment, a mobile device's location data such as made available by its GPS receiver can be uploaded to the rendering host. The rendering host may elect to send position-sensitive digital content to the client device by matching a client device's location against the digital content's location base. For example, a traffic information user group may have collected some traffic reports uploaded by casual authors with their locations defined by GPS. By identifying its location a client device will receive traffic reports only close to its location. In further embodiments, location history of a client device as is stored in the computing cloud's user database 114 helps to precisely address the user's location based needs. For example, location data collected in the past few minutes help to identify the heading of a mobile user. It is advantageous only to offer the traffic reports for the area it is heading to. Furthermore, daily or weekly mobile behavior can precisely be analyzed to increase the accuracy of the location-sensitive media offerings. As an example, the rendering host may further have identified that an office goer frequently dines on Friday evening after work. It can therefore deliver discount coupons for those restaurants along the usual path he or she takes after work. It can deliver the coupons according to the user's general geographic preferences according to the past history or change the offerings on the fly while he or she is already on a moving vehicle with a heading known to the rendering host.

User groups can further become a useful tool for target marketing. For example, by looking into the user database 114 and subscriptions to user groups 114a, the computing cloud may get to know that someone is in general located in the greater Los Angeles area, being interested in jazz, community affairs and dining out. The computing cloud may serve as the agent to precisely deliver the ads to those users who are more likely to be interested in the product offer. Furthermore, dissemination of ad media clips can be as easy as doing casual authoring. The computing cloud, acting as the agent for dissemination of ad clips, can establish 'ad virtual user groups' by sorting client devices' user database 114. Each ad virtual user group represents a consumer genre in age, location, profession group, for example. Any party who would like to launch an ad clip can pick those virtual user groups it would like to address, or create its own virtual user group by options offered by the computing cloud. Once the ad media clip is uploaded to the ad virtual user groups of its choice, the inserting agent 113d helps in delivering to the group of users targeted.

User group inserting clips in general reflect the recipient's special areas of interest. The recipient may opt to invite others to join the user group which he or she feels benefited. Invitations to join a user group can be done with a prompt distributed to other members or non-members of this system. Prompting service can be done easily by those who are skilled in the art.

Many mobile devices consume more battery power in making radio connection to the network than playing back pre-downloaded digital content. In one embodiment the client acting as a digital content consumer may optionally request the rendering host to provide an alternative higher internet bandwidth so that the PBP requested and its media clips can be delivered to the client device in a shorter radio air time, allowing the client device to play back media clips in the PBP for a longer radio offline time. Examples of a higher bandwidth mode include using offloading WiFi or allocating a larger downloading bandwidth in a mobile network. By using the high bandwidth mode in downloading, media content can be streamed quickly and the client device can shut off network connection once the downloading is done. It will play back in the low power consumption playback mode until the media downloaded is consumed or is about to run out. The battery power of the client device can therefore last for a longer period of time. By using the tactic of a long playlist the client device may re-connect to the rendering host only occasionally to save power consumption. Step S717 of FIG. 7 depicts how an alternative path in a consumer's process makes the power saving mode possible.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

Although the foregoing description has been made with reference to the preferred embodiments, it is to be understood that changes and modifications of the present invention may be made by the ordinary skilled in the art without departing from the spirit and scope of the present invention and appended claims.

What is claimed is:

1. A method for carrying out iterative media broadcasting rendering from the cloud, the method comprising:
   connecting a client device to a remote computing cloud wherein a rendering host keeps one or more pre-broadcast playlists (PBP);
   the client device choosing a role among being a consumer or a superintendent to the PBP, or a producer to another PBP, wherein each PBP includes a list of media clips in a playing sequence, and a set of metadata that includes editing attributes in a format known to the rendering host and the client device, said editing attributes comprising lag time behind a preceding media clip; and
   the rendering host reconstructing an original client device's production work according to the editing attributes in the PBP,
   wherein the client device performs an operation corresponding to the role, and a producer console application is executed in the client device to perform a complete PBP editing function including downloading a PBP and said media clips from the rendering host to carry out non-rendering host-assisted re-mixing of the original production work according to the editing attributes in the PBP with the goal or purpose of reducing load on the rendering host.

2. The method of claim 1, wherein the editing attributes further comprise playing sequence, time to play, sound effect changes used and time relations among adjacent pieces of media clips to be played.

3. The method of claim 1, wherein another client device downloads and reconfigures the PBP, or adds, deletes or replaces one media clip in the PBP.

4. The method of claim 1, wherein while the client is in the producer role, the steps of producing a PBP comprise:
   carrying out primary production and creating a primary production playlist; and
   providing the primary production playlist to the rendering host to be used as the PBP the rendering host keeps and delivers to other client devices.

5. The method of claim 4, further comprising:
   downloading desired pre-recorded clips from the rendering host to the client device;
   recording a piece of primary production voicetrack and creating its associated metadata;
   setting a sequence to play the pre-recorded clips and the primary production voicetrack and optionally identifying dependency and partial use and carrying out sound effect changes;
   setting the editing attributes in metadata corresponding to the pre-recorded clips and the primary production voicetrack according to their time relations and sound effect changes; and
   uploading the primary production playlist, the metadata corresponding to the primary production playlist and the primary production voicetrack to the rendering host.

6. The method of claim 1, wherein the rendering host selectively mixes some neighboring media clips in the PBP into combined media clips according to the authorization of the client device expected to play back or edit the PBP.

7. The method of claim 4, further comprising:
carrying out secondary production based on the PBP provided by the primary producer; and
providing the secondary production playlist to the rendering host to be used as the PBP the rendering host keeps and delivers to other client devices.

8. The method of claim 7, further comprising:
downloading the PBP provided by the primary producer and its corresponding metadata and media clips;
re-constructing the primary producer's PBP and playing back media clips included;
recording a piece of new production voicetrack corresponding to the primary production voicetrack and creating its associated metadata;
replacing the primary production voicetrack and its metadata in the primary PBP with the new production voicetrack and its metadata to become the secondary production playlist;
setting the editing attributes in metadata corresponding to the media clips and the new production voicetrack according to their time relations; and
uploading the secondary production playlist, the metadata corresponding to the secondary production playlist and the new production voicetrack to the rendering host.

9. The method of claim 1, wherein the client device downloads one or more PBPs from the rendering host while being in the consumer role.

10. The method of claim 9, wherein while the client is in the consumer role, the steps of consuming one or more PBPs further comprise:
downloading one or more PBPs with their associated metadata;
creating a derivative playlist based on host playback policy as stated in the metadata associated with the PBP and the consumer's preferences and priorities;
requesting the rendering host to download pieces of media clips as indicated in the derivative playlist;
performing playback; and
submitting a playback scores to the rendering host.

11. The method of claim 10, further comprising filling in with backup media clips in device content store if the rendering host cannot deliver the media clips listed in the derivative playlist in time, or if the metadata in the derivative playlist indicates the need to fill in.

12. The method of claim 10, wherein in the consumer role the client device transfers the authorization to use a media clip to another client device, with steps further comprising:
creating an inserting playlist based on the authorization of one of the media clips' account attribute as is indicated by the metadata associated with the PBP; and
providing the inserting playlist to the rendering host to be used as the PBP the rendering host keeps and delivers to another client device as a gift.

13. The method of claim 10, wherein in the consumer role the client device casually authors a media clip and uploads it to the rendering host, with steps further comprising:
optionally clicking the record button on the application and creating a recording clip;
optionally playing back to review the recording clip and creating an inserting playlist with its associated metadata;
uploading the recording clip, the inserting playlist and its metadata to the rendering host to be used as the PBP the rendering host keeps; and
delivering the PBP, the recording clip and the metadata to a user group the consumer designated or a virtual user group the rendering host sorted from the user database related to one or more client devices.

14. The method of claim 4, wherein while the client is in the producer role, the uploaded primary production playlist, pieces of media clips and their associated metadata are converted from media content and playlists created by conventional radio or TV broadcasters.

15. The method of claim 1, wherein while the client is in the superintendent role, the steps of superintending a PBP of the superintendent further comprise:
downloading the PBP provided by the primary producer and its corresponding metadata and media clips;
re-constructing the PBP and playing back media clips included;
while listening optionally pressing a button to identify media clips that it desires to remove;
uploading the PBP with the removed media clips identified in their associated metadata; and
allowing the rendering host to remove the media clips from the PBP as instructed and broadcast the modified PBP to other client devices.

16. The method of claim 1, further comprising:
on request the rendering host optionally providing an alternative higher internet bandwidth so that the PBP requested and its media clips can be delivered to the client device in a shorter radio air time, allowing the client device to play back media clips in the PBP for a longer radio offline time.

17. The method of claim 1, wherein while the client is in the producer or the superintendent role, the media clips are being downloaded optionally in a lower fidelity format than while the media clips are being downloaded by a client device in the consumer role.

18. The method of claim 1, wherein the client device is a mobile device.

* * * * *